United States Patent Office 2,723,231
Patented Nov. 8, 1955

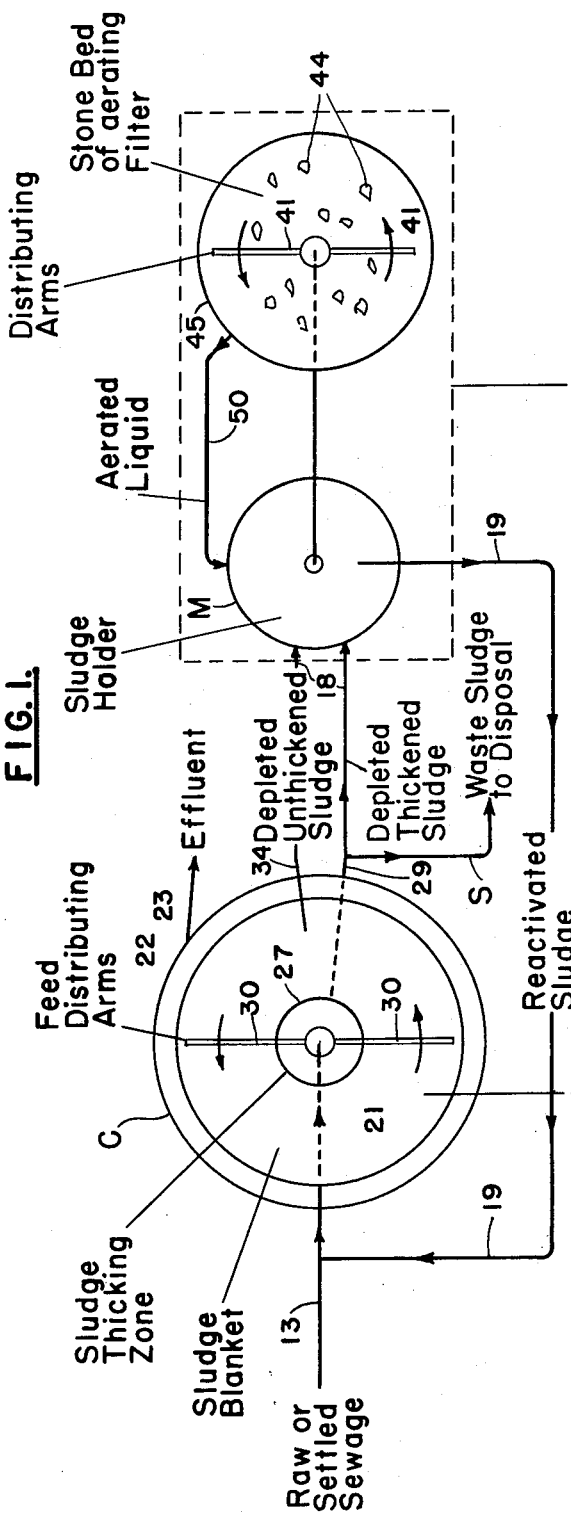

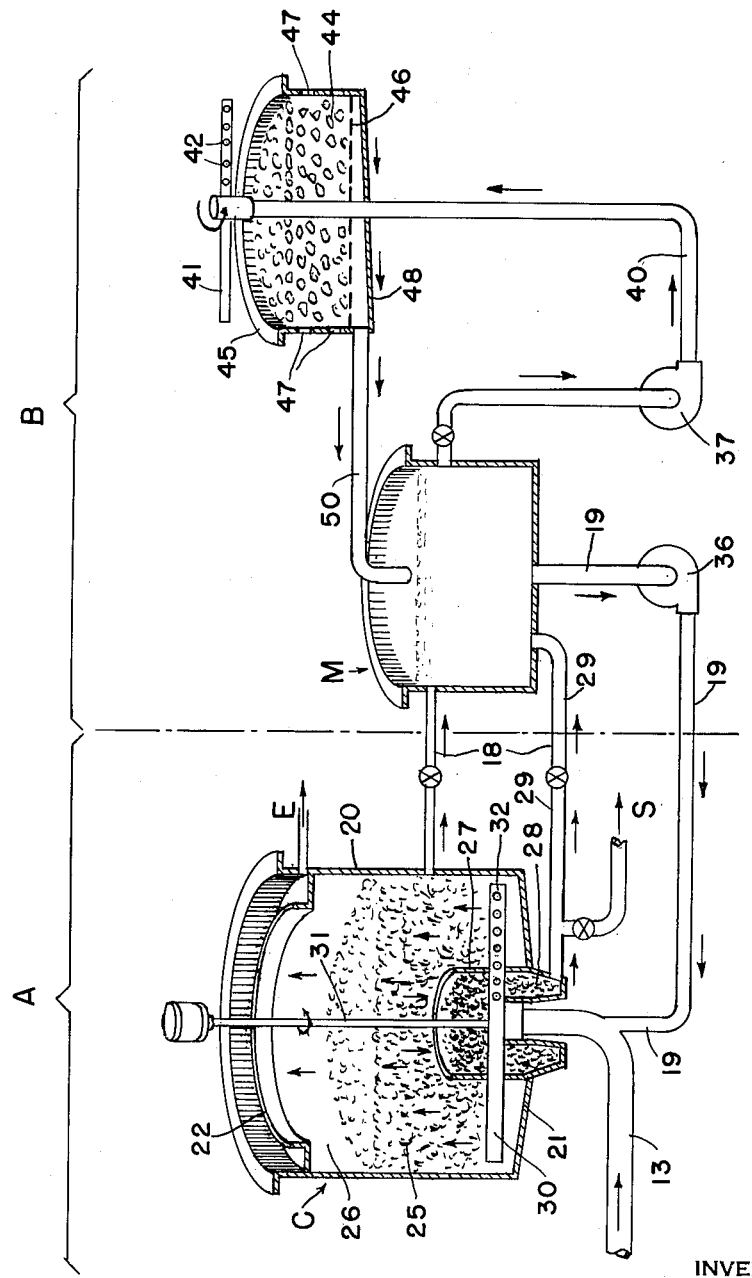

2,723,231

SEWAGE TREATMENT

Robert P. Logan, Westport, Conn., and Anthony J. Fischer, Manhasset, N. Y., assignors to Dorr-Oliver Incorporated, a corporation of Delaware Application April 8, 1952, Serial No. 281,156

9 Claims. (Cl. 210—8)

This invention relates to the clarification and purification treatment of sewage and other organically polluted waters, and more particularly to improvements in connection with the activated sludge process of sewage treatment. In that process, the polluting constituents of the sewage are subjected to biologic action of aerobic organisms for rendering them inert and innocuous, but these organisms, being aerobes, require oxygen to live, so the oxygenation or aeration of them while in suspension in the sewage presents a cost problem, so one of the objects of this invention is to devise ways and means for improving on the present usual methods of aerating all of the sewage flow and doing it by compressed air bubbled up through the sewage.

The polluting constituents of the sewage include liquid-phase material that has a high biological oxygen demand (B. O. D.) in which are suspended putrescible solids of widely different sizes, with many in the colloidal size range. When sewage solids settle as a result of sedimentation in a settler the sediment is usually called sludge. There is not too much trouble in sedimenting those suspended solids whose size is conducive to settling, but those whose size is in the colloidal range present problems because of their tendency to resist rapid settling. So another object of this invention is to devise ways and means to improve the segregation of such slower settling solids in the flow of sewage, especially by physical or bio-physical steps. After the solids are segregated in the main flow of sewage liquid, they have to be treated bio-chemically and purifying (with the activated biologic organisms) so still another object is to find how to extract such segregated solids from the place of their segregation in the sewage liquid and remove them to a separate place of bio-chemical purifying treatment.

And a yet further object is to find out how to use such bio-chemically treated, segregated, extracted solids to stimulate the depuration treatment of the main flow of sewage. These and other objects can be realized establishing and maintaining in an upwardly flowing stream of sewage a sludge blanket with a definite upper limit of suspended sewage solids and with a layer of clarified liquor supernatant thereabove with such liquor overflowing from that layer. Particles in the sludge blanket are agitated to be in constant motion or molized sufficient to cause flocculation of its suspended solids and the accretion of smaller solids, such as colloids, into groups or clusters of larger solids, yet with the agitation not intense enough to cause the suspended solids of the blanket to roil up into the supernatant layer of clarifier liquid. This is referred to herein as the bio-physical zone and it lies within the upflowing main stream of the sewage. Then there is established and maintained an independent zone or station that is referred to as the bio-chemical or biologic purification zone wherein there is a holding-and-mixing tank in closed circuit with an aerator. A minor quantity of sludge from the sludge blanket is bled off to this bio-chemical zone preferably into the holding-and-mixing tank from whence it is rapidly recirculated to and from the aerator (in the preferred form a high-rate trickling filter) where the sludge is oxygenated or aerated to increase its oxygen content whereby the biologic organisms in the sludge can grow, multiply, and do effectively their desired purifying work. Next, a quantity of resulting sludge is mixed with sewage in the flowing stream at a point that is up-stream or ahead of the sludge blanket. Thus, the flowing stream carries this activated sludge and projects it into and through the sludge blanket in a meandering or mobilized fashion so that it permeates the blanket and thus comes into contact with the raw solids therein. The activated sludge solids so introduced into the blanket have a high degree of surface activity enabling them to absorb colloidal sewage matter from the sewage. In other words, the activated sludge solids accrete or cause to be deposited onto themselves a surface load of untreated and still putrescible colloidal matter. This assumption of a surface load or coating of putrescible matter in the sludge blanket by the activated and purified activated sludge solids is called herein bio-physical action, and the loaded activated sludge solids are then removed or extracted from the blanket and returned to the bio-chemical zone where the biologic organisms attack the putrescible loadings on the previously activated sludge solids to purify those loadings. In the bio-chemical zone, the putrescible solids and especially the colloidal matter brought thereto by the activated solids are fed upon by the biologic organisms in the bio-chemical zone to be purified and rendered into activated sludge solids ready to go back to the bio-physical zone for another load. Thus, one concept of this invention is to send messengers of activated sludge solids, previously activated and purified by biologic treatment in an independent place, into a sludge blanket of solids segregated therein maintained so in an upflowing main stream of sewage to bring back to the place of activation a load of raw solids that are there to be purified.

The preferred embodiment of the invention is shown in the accompanying drawings, but it has been selected for illustrative but not limiting purposes for obviously various changes, if functionally as well as cooperatively equivalent, can be made without departing from the metes and bounds embraced within the scope or ambit of the appended claims. In the drawings, Figure 1 is a plan view with parts shown symbolically of an embodiment of the invention. Fig. 2 is a much simplified plan view of the environment that may precede the embodiment shown in Fig. 1. Fig. 3 is a vertical sectional view, with parts shown isometrically, of the parts shown or indicated in Fig. 1.

This invention finds embodiment in continuously treating organically polluted sewage or trade-wastes in two conjointly cooperating stations of which zone or station A is for bio-physical solids-accreting treatment of the main sewage flow while zone or station B is for the bio-chemical sludge-purification treatment of a small fraction of sludge segregated in and extracted from that flow. The initial treatment station A receives the sewage whose sludge is then recycled to the subsequent biologic purification station B and back again, with activated sludge S being released from station A along one path while purified clarified (depurated) effluent liquid E is released from that station along another path. Figure 2 is a flow-sheet showing that the receiving station A can receive raw sewage directly from sewer 11 through a by-pass line 12, and inlet pipe 13, or station A can receive effluent from settled raw sewage that has been supplied through pipe 14 to a sedimentation apparatus such as primary clarifier 15, from which is discharged raw sludge through pipe 16, and clarified effluent through pipe 17. In other words, the receiving station A can treat either raw or settled sewage. In flow-sheet shown in Fig. 2, bio-physically accreted sludge in distinction from normal primary settled sludge or sewage from station A is supplied to station B through pipe 18, while activated and biologically purified sludge from station B is returned to station A through pipe 19 to be mixed with and dilute the sewage incoming to station A through pipe 13. Now to better understand what comprises the stations A and B, let us look at Fig. 1, which is a somewhat diagrammatic plan view thereof, and at Fig. 3, which is a somewhat symbolic vertical sectional isometric view thereof. The stream of sewage enters through pipe 13 upwardly into a sedimentation tank or container C of special characteristics that is in station A. It is cylindrical with side walls 20 and bottom wall 21. At its top is a liquid-overflow weir 22 providing a launder 23 from which clarified and purified liquid exists as effluent E. When in operation, the tank C has a sludge blanket 25 of suspended solids overlain by a layer of supernatant clarified liquid 26, and in the central bottom of the tank is a sludge-thickening and sludge concentrating zone illustrated by the pocket or hopper 27 that terminates at its bottom in an annular trench 28 from which the thickened sludge S is discharged through pipe 29. This sludge-thickening pocket is submerged in and surrounded by as well as overlain by the sludge blanket 25. Sewage-delivering and distributing arms 30 are rotated by a suitable drive mechanism 31 (with which the upper section of the sludge-thickening pocket 27 may rotate). These arms 30 are perforated at one side as shown at 32. A stream of sewage incoming through pipe 13 has mixed with it re-activated sludge coming from station B through pipe 19, whereupon the mixture rises to be distributed through arms 30 fairly uniformly over the entire cross-section or the tank 20 within the lower region of the sludge blanket 25. The feed-pressure and the speed of rotation of the arms 30 must be such as to give enough head to the stream to cause it to rise percolatingly through the sludge blanket of solids suspended therein and to overflow the weir 22 and to keep the components of the sludge blanket mobilized or in commotion, but not so high as to roil up the sludge particles to preclude the usual overlying or supernatant layer 26 of clarified liquor. This agitative motion of the upflowing stream of sewage is enough to cause flocculation and coagmentation of suspended solids into flocs which in their continued agglomeration or accretion become settable whereupon they descend into the sludge-thickening pocket 27, that is shielded from turbulence of the upflowing stream. Unthickened components of the sludge blanket 25 can be drawn off through pipe 34 to be passed to the treatment station B. Pipes 29 and 34 are collectively numbered as 18 in Fig. 2. All of the pipes in all of the figures are indicated by a circle with a X in it as being suitably valved to give desired control. The quantity of sludge bled off or drawn from the zone A to zone B lie in a range of from substantially 20% to substantially 40% of the volume of sewage newly inflowing to zone A.

Referring now to station B, sludge derived from the sludge blanket flows through pipes 34 and 29 (jointly forming flow-passage 18) and into a non-sedimenting mixing-and-holding tank M which may have in it an agitator, if desired, from which is pumped by pump 36 through pipe 19 to be mixed with sludge incoming to station A. Sludge from mixing-and-holding tank M is pumped by pump 37 through pipe 39 into pipe 40 leading to reaction driven distributing arms 41, each with perforations and spray nozzles 42 on one side thereof, so that the sludge is sprayed as a deluge over the bed of discrete solids such as stones 44, held in tank 45 that has a slat-like bottom 46 providing perforations through which can descend the sludge there being aerated. The tank 45 is the place of aeration of the biologic organisms in the sludge so its side walls are also perforated to be air-permeative as at 47 to permit entrance of air into the tank and between the stones. Sludge descending through the stones 44 and through the perforations 46 in the tank is caught by a sump 48 and conducted through pipe 50 back into the mixing and holding tank M, as sludge that has been synonymously well activated, aerated or oxygenated.

So much for the apparatus aspects of the constituents of bio-physical station A and bio-chemical station B. Now let a look be given to the functional aspects of these stations. Taking station B first, the de-activated sludge including bio-physically accreted solids bled off from station A and received by mixing-and-holding tank M is pumped to and sprayed over the stones 44 of the trickling filter 45, which differs from ordinary trickling filters by the shallow depth of its bed of stones and the high rate of application of the sewage material thereto. In usual trickling filters, the stones are several feet deep in their bed, indeed six and sometimes eight feet deep and the rate of application of the sewage is low enough so that each stone is coated with zoogloeal films in which the biologic organisms are substantially fixed during their life cycle, including their generation, incubation, and growth. Unlike this usual arrangement, the so-called filter 45 of this invention has not more than substantially one foot depth of stones and the rate of application of the sludge is so great that no such films develop on the stones, but they are flushed clean and are kept clean of such growths. No retention of biologic organisms is desired in this bed of discrete elements. The sole function of spraying the sewage sludge onto this bed, and the rapid flushing of it through the bed is to aerate and oxidize that sludge. These biologic organisms are aerobic, namely, they live and thrive only in an environment with a high oxygen content, so the more air that can be added to the liquid of their environment, that is, the more the liquid is oxygenated, the greater is their ability to grow, multiply and function. They do not need to be immobilized in films on the stones, because if there is enough air in their liquid environment, they live and function effectively. To aid in this picking up of air by the sewage sludge, the air-inlets 47 are provided in the side walls of the tank 45.

So then, the sludge gets highly aerated in this high rate of application onto the shallow bed of stones by percolating through it, for the stones are swept clean of zoogloeal films and other clogging or plugging solids. The highly aerated sludge then passes from the bed of stones 44 of the aerating filter 45 directly into the mixing-and-holding tank M wherein there is sufficient agitation to minimize sedimentation or settling of suspended solids. Here in the tank M the thus delivered highly activated and reactivated sludge encounters a mixture of (1) thickened or concentrated sludge segregated in and extracted from station A delivered through pipe 29; (2) unthickened or unconcentrated but accreted sludge particles from the sludge blanket 25 from station A delivered through pipe 34; and (3) a significant quantity of previously delivered aerated or activated sludge from filter bed 45. So here there is effected biologic activity of a high order. That is, the biologic organisms including bacteria, in rapidly moving about the liquid mixture, eat the sewage solids that are their food, and convert them into excrescences that include purified liquid, gases, and substantially inert solids. Thus, the tank M is the work shop for the beneficient organisms and the recirculation of sludge bearing these organisms to the place of aeration in the filter bed tank 45 is highly repetitive to assure ample oxygen in the environment of the organisms. The life cycle of such aerobic organisms is of the order of only twenty minutes, so it can be seen that they must have ample oxygen. So in treatment station B, which includes in repetitive cycle arrangement aerating filter 45 and the mixing-and-holding tank M, the organisms are kept amply aerated in the filter tank 45, and they do their bio-chemical activity in the mixing and holding tank M, namely they do the satisfying of the biologic oxygen demand B. O. D. of the sewage components with which they here come into contact. As has been said, their excrescences comprise purified liquid and rather inert solids that agglomerate into suspended masses thereof, which with associated biologic organisms are called activated sludge. The solids are of feathery nature and flocculate rather readily. The liquor has a high content of oxygen, so these results of bio-chemical activity taking place in this station B, cause it to be called herein the bio-chemical station.

The size of the stones or other discrete solids 44 making up the body of the filter bed 45, lie in a range of from substantially three inches in diameter to substantially five inches in diameter and the depth of the bed of stones is substantially one foot, depending however upon the economics of pumping because the bed could be deeper with advantage. The rates of application of the sludge to the filter bed 45 and the detention or holding time of the holding-and-mixing tank M depend somewhat upon the strength of the sewage to be treated. But based upon normal settled sewage, the rate of application to the filter-bed lies in a range of from substantially 200 million to 400 million gallons per acre per day while the holding or volumetric capacity of the tank M should lie in a range of from substantially one hour to 5.6 hours based upon the inflow into that tank, although in treating most normal settled sewage it may be sufficient to have the holding time lie from two to four hours.

Now let us go to the bio-physical station A. Activated and re-activated sludge suspended in purified liquid is passed from this bio-chemical factory (station B) to be mixed with and to dilute sewage in the stream incoming to the station A through inlet pipe 13. This is done by having the pump-equipped pipe 19 that leads from the non-sedimenting mixing and holding tank M enter the incoming feed delivery pipe 13 prior to discharge of the content of the latter into tank C of the reacting station and which in fact, provides and functions as a bio-physical station. The incoming raw sewage diluted with reactivated or highly activated sludge from pipe 19 is distributively released into the lower region of the sludge blanket 25 within said tank from the perforated rotating arms 30 therein. The sludge blanket is made up of a major proportion of reactivated solids in suspension and a minor portion of particles of untreated sewage solids having a high B. O. D. This activated and reactivated sludge has oxygen in its mother liquor and also a high degree of surface activity with the result that as soon as it contacts the sewage solids of the blanket, it attracts to itself and accretes on its surfaces by absorption, and mechanical entrainment quantities of dissolved, colloidal, and suspended impurities of the sewage. This loading of untreated solids onto the surface of the treated activated sludge particles is a rapid action so that in a relatively short time it is complete. The sewage liquor tends to pass upwardly through the sludge blanket while the accreted sludge particles remain in the blanket because of their feathery nature and greater density. The purified sewage passes upwardly out of the blanket and is removed from the tank C by the peripheral overflow weir 22 at the top of the tank. In purifying the sewage, the activated or purified sludge that was added in the pipe 13 to enter the blanket, increases in quantity due to the material that it accretes or has deposited onto itself whereupon to bring about purification of its surface load of untreated solids, it is returned to the bio-chemical purifying station B through valve controlled transfer pipes 34 and 29 (collectively designated 18).

Coming back once more to the place of sludge aeration in the tank 45, only activated sludge needs to be supplied to the filter bed composed of a discrete assembly of stones 44 therein. The sludge is held in the bed only momentarily due to the high rate of application, the large size of the stones, and the shallow depth of the bed of stones. No cultures of the bacteria are to be built up in the bed, but the stones are to be flushed clean of fixed organisms. The cultivation of bacteria is to be avoided here. The only function of this bed is thoroughly and effectively to aerate the sludge that is flushed through it. And it is to be noted that only sludge is supplied to the bed from the mixing-and-holding tank M, because only sludge is supplied to that tank from the tank C through pipes 34 and 29. Supernatant clarified sewage liquor is released from the tank C through the launder 23 as purified effluent. It is believed to be a significant feature of this invention that only sewage sludge from the tank M is aerated and not all of the sewage flow, as is now usual. All of the sewage flows through the bio-physical solids-accreting station A while sludge therefrom which is aerated and biologically purified in bio-chemical conditioning station B and returned to that bio-physical station represents but a minor fraction with respect to the total sewage volume. The segregation of bio-chemical activity in a minor flow of sludge in one station, and the segregation of bio-physical activity of the major flow of all the sewage in another station, comprises a novel innovation proposed by this invention. And another important feature of this invention is the combination, in one tank, of carrying out in an upflowing stream of sewage the sedimenting of sewage solids to effect one layer of clarified liquid, a subjacent layer or blanket of flocculated sludge, and a sludge-concentrating zone beneath the sludge blanket, shielded from the upflowing stream to which stream in the tank activated sludge is distributively supplied that has been activated elsewhere.

We claim:

1. The continuous process of purifying organically polluted liquids such as raw sewage and the like by means of biologic aerobic treatment, which comprises establishing and maintaining in an upflowing stream of sewage a sludge blanket zone of sewage solids in motion in the blanket and with the blanket overlain by a layer of clarified liquor from which such liquor overflows; withdrawing sludge from said blanket at a controlled rate and subjecting a quantity thereof to biologic aerobic treatment by detention in a pool continuously providing a bio-chemical treatment zone with aerobic organisms active therein in sufficient quantity, sufficiently long, and sufficiently oxygenated to have a significant quantity of organic sewage matter converted into biologic floc structures potentially absorptive and adsorptive with respect to dissolved and colloidal matter as well as adapted to entrap and entangle suspended matter contained in the sewage; recycling a significant quantity of such floc structures to said blanket to intermingle with sewage continuously supplied to the blanket whereby such floc structures absorb and adsorb quantities of said dissolved and colloidal sewage matter to form composite floc structures while entrapping a quantity of said suspended sewage matter, whereby said sludge blanket zone acts as a bio-physical treatment zone with respect to the formation of such composite floc structures and as distinct from the function of said bio-chemical treatment zone, with a significant quantity of such composite floc structures carrying with them and between them a quantity of raw sewage solids contained in said sludge that is being withdrawn from said blanket zone for treatment in said bio-chemical zone; and diverting a quantity of sludge containing said composite floc structures from said blanket zone to an outside place for further disposal.

2. The process according to claim 1, with the addition that a quantity of sludge withdrawn from said blanket is subjected to thickening in a thickening zone prior to being subjected to treatment in said bio-chemical treatment zone.

3. The process according to claim 1, with the addition that a quantity of sludge withdrawn from said blanket is subjected to thickening in a thickening zone having direct communication at the top thereof with said sludge blanket zone.

4. The process according to claim 1, in which the aerobic treatment comprises continuously cycling a quantity of sludge from said pool through a mass of discrete material in trickling fashion and back to said pool, at a rate sufficiently high to provide oxygenation for maintaining said active aerobic conditions in said pool.

5. The process according to claim 1, in which the fraction of sludge passed from the bio-physical zone to the bio-chemical zone lies in a range of from substantially 20% to substantially 40% of the sewage flow newly supplied to the bio-physical zone.

6. Apparatus system for continuously purifying polluted liquids such as raw sewage and the like by means of biologic aerobic treatment which comprises a first treatment tank having a bottom feed supply means for discharging sewage directly into the bottom of said tank as well as overflow means at the top, whereby there is maintained in the tank an upflowing stream of sewage comprising in the lower portion thereof a sludge blanket zone with sewage solids in motion therein and overlain by a zone of clarified liquor to pass from the tank by way of such overflow means, together with sludge thickening means in hydraulic communication with said sludge blanket zone for concentrating a quantity of the solids contained in the sludge blanket, and discharge means for withdrawing thickened sludge comprising significant quantities of composite floc structure from the system; an aerobic treatment station comprising a second treatment tank in circuit with said first treatment tank and adapted to hold a large enough volume to provide sufficient detention time and exposure of the sewage matter to aerobically active treatment conditions to effect aerobic treatment of such matter, said second tank having between it and the first tank flow-transfer means for continuously passing thereto a significant quantity of sludge from said blanket zone, as well as flow-return means for passing a like quantity of sludge from the second tank to the first tank for mixing with the incoming raw sewage, primary pumping means between said first treatment tank and said second treatment tank for effecting and sustaining the circulation of sludge through said first and second tank by way of said flow-transfer and said flow-return, means for controlling the rate of such circulation, sludge oxygenating means in hydraulic communication with said second treatment tank for continuously maintaining in said second treatment tank aerobically active conditions to effect conversion of said sewage matter into biologic floc structures, said floc structures being adapted to return in significant quantity through said return flow means to said sludge blanket in the first tank and to adsorb and absorb dissolved and colloidal sewage matter from the incoming raw sewage to form composite floc structures adapted to entrap and entangle suspended raw sewage solids, which composite floc structures carrying along with them added raw sewage matter are adapted to pass in significant quantity through said flow-transfer means from said first treatment tank to said aerobic treatment station for effecting aerobic treatment and conversion into floc structures of such added sewage matter.

7. Apparatus according to claim 6, characterized by the fact that the said sludge thickening means in hydraulic communication with said sludge blanket zone comprises a thickening pocket embodied in the bottom portion of the first treatment tank, the top end of which pocket has direct communication with said blanket to receive the sludge therefrom at a level spaced an appreciable distance upwardly from the tank bottom and from said feed supply entering the tank and that said flow transfer means receive thickened sludge from the bottom of said pocket.

8. Apparatus according to claim 6, characterized thereby that the said sludge thickening means in hydraulic communication with said sludge blanket zone comprises a thickening pocket embodied centrally in the bottom portion of the first treatment tank and surrounded by said sludge blanket with the top end of said pocket spaced an appreciable distance upwardly from the tank bottom, to have sludge from said blanket pass across said top end into said pocket, and that there is provided a rotary distributing structure to revolve about said pocket and comprising a plurality of horizontally extending sewage delivering and distributing arms extending at a level appreciably below the top edge of said pocket.

9. Apparatus according to claim 6, in which the said sludge oxygenating means in hydraulic communication with the said second treatment tank comprises, a trickling filter unit operatively in circuit with said second treatment tank and having a stationary mass of discrete material through which gravitates sludge passed thereto for aeration from said second treatment tank and from which filter unit the aerated sludge returns to the second treatment tank, with the addition of conduit means and pumping means for controllably maintaining the circulation of sludge through said second treatment tank and said filter unit.

References Cited in the file of this patent

UNITED STATES PATENTS

| | | |
|---|---|---|
| 2,168,208 | Jenks | Aug. 1, 1939 |
| 2,355,760 | Trebler | Aug. 15, 1944 |
| 2,382,490 | Lawlor | Aug. 14, 1945 |
| 2,492,486 | Kivari et al. | Dec. 27, 1949 |
| 2,517,792 | Kraus | Aug. 8, 1950 |